US012287922B2

(12) United States Patent
Rizzardini et al.

(10) Patent No.: US 12,287,922 B2
(45) Date of Patent: Apr. 29, 2025

(54) SYSTEM AND METHOD FOR AUTOMATIC RECOGNITION OF THE GESTURE OF BRINGING AN ELECTRONIC DEVICE TO THE EAR

(71) Applicant: STMICROELECTRONICS S.r.l., Agrate Brianza (IT)

(72) Inventors: Federico Rizzardini, Milan (IT); Lorenzo Bracco, Chivasso (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 18/512,944

(22) Filed: Nov. 17, 2023

(65) Prior Publication Data

US 2024/0192783 A1   Jun. 13, 2024

(30) Foreign Application Priority Data

Dec. 13, 2022  (IT) ........................ 102022000025482

(51) Int. Cl.
*G06F 3/01*   (2006.01)
(52) U.S. Cl.
CPC .................................... *G06F 3/017* (2013.01)
(58) Field of Classification Search
CPC ..... G06F 1/16; G06F 3/0346; H04M 1/72454
See application file for complete search history.

(56) References Cited

U.S. PATENT DOCUMENTS

| | | | |
|---|---|---|---|
| 10,942,578 B2 | 3/2021 | Rivolta et al. | |
| 2011/0206215 A1* | 8/2011 | Bunk | G06F 1/1694 381/74 |
| 2012/0218218 A1* | 8/2012 | Kauko | G06F 3/04186 345/174 |
| 2014/0232516 A1 | 8/2014 | Stivoric et al. | |
| 2015/0313552 A1 | 11/2015 | Zhang et al. | |
| 2016/0252963 A1 | 9/2016 | Elkins et al. | |
| 2016/0342781 A1 | 11/2016 | Jeon | |
| 2020/0081546 A1* | 3/2020 | Rivolta | H04M 1/724 |
| 2021/0232227 A1* | 7/2021 | Passaniti | G06F 3/044 |

FOREIGN PATENT DOCUMENTS

| | | |
|---|---|---|
| EP | 2980609 A1 | 2/2016 |
| KR | 20110061750 A | 6/2011 |
| WO | WO 2012166277 A1 | 12/2012 |

OTHER PUBLICATIONS

Yan et al., "Electrostatic Sensors—Their Principles and Applications," University of Kent, Author manuscript, 2021. (83 pages).

* cited by examiner

*Primary Examiner* — Robin J Mishler
(74) *Attorney, Agent, or Firm* — SEED IP LAW GROUP LLP

(57) ABSTRACT

A recognition system for recognition of a gesture of bringing an electronic device, of a mobile or wearable type, to a user's ear, designed to be integrated in the electronic device and having: a movement sensor, configured to provide a movement signal indicative of the movement of the electronic device; an electrostatic charge variation sensor, configured to provide a charge variation signal associated with the movement; a processing module, operatively coupled to the movement sensor and to the electrostatic charge variation sensor and configured to perform a joint processing of the movement signal and the charge variation signal for the recognition of the gesture.

16 Claims, 5 Drawing Sheets

SYSTEM AND METHOD FOR AUTOMATIC RECOGNITION OF THE GESTURE OF BRINGING AN ELECTRONIC DEVICE TO THE EAR

BACKGROUND

Technical Field

The present solution relates to a system for automatic recognition of the gesture of bringing an electronic device to the ear and to a corresponding method for recognition of the aforementioned gesture.

Description of the Related Art

As known, gesture recognition systems are commonly implemented in the so-called "smartphones", i.e., in the latest generation cellular phones, or in similar mobile electronic devices, such as "phablets" or "tablets", or wearables, such as smartwatches or electronic bracelets, in order to enable certain functions, such as for example opening a photo- or video-camera application or displaying notifications on the screen.

In particular, the recognition of the gesture of bringing the electronic device to the ear (so-called "phone-to-ear" gesture in the most common case of use in a smartphone or similar mobile or wearable electronic device capable of cellular communication) is commonly implemented, in order to manage an incoming call and in particular to automatically activate answering to the call and turning-off of the screen.

The aforementioned "phone-to-ear" gesture generally includes any movement that the user commonly makes when bringing the electronic device to the ear, regardless of the initial position of the same user and of the same electronic device; for example, the following possible use situations may occur:
- user seated and electronic device on a table (or similar supporting surface);
- user seated and electronic device in a pocket (or similar accommodation);
- user standing and electronic device on a table (or similar supporting surface);
- user standing and electronic device in a pocket (or similar accommodation); and
- others (for example, user walking, user in a lift, user lying down, etc.).

Currently, the system for recognition of the aforementioned "phone-to-ear" gesture generally utilizes a proximity sensor, suitably arranged at a front surface of the electronic device (which carries the display screen, normally of the "touch screen" type), typically in a top portion of the same front surface; this proximity sensor senses the approach of the user's ear and generates a corresponding signal which is provided to the operating system of the electronic device to implement suitable functions (in particular, for automatically answering and turning-off the screen).

For example, the proximity sensor may be implemented with optical technology, with generation of a light radiation beam, for example a laser beam, by a source and reception of the same beam, reflected by an impinging surface (in the specific case, the ear), by a receiver; suitable algorithms are implemented, for example "time-of-flight" algorithms, to determine the distance between the emission source and the reflecting surface.

However, the presence of the aforementioned proximity sensor, which is placed, as previously indicated, at the top portion of the front surface of the electronic device, limits the possibilities of reducing the top edge of the frame surrounding the screen and in any case is a constraint to the design of the same electronic device.

To overcome this problem, at least in part, some manufacturers have proposed the introduction of a so-called "notch", i.e., of a recess formed at the top part of the display screen, to accommodate the aforementioned proximity sensor.

However, this solution, in addition to having a significant aesthetic impact, entails a certain reduction in the space available for the display area; the need to reduce, as much as possible, the area occupied by this notch is therefore certainly felt.

The present Applicant has also found that the proximity sensor, in addition to consuming a considerable area occupation (the package of a proximity sensor currently available on the market has for example dimensions of the order of 5×3×1 mm), has a significant electrical power consumption.

In general, the presence of the proximity sensor represents a cost for the manufacturer and inevitably increases the complexity of the printed circuit board (PCB) of the mobile electronic device (for example in terms of definition of the traces and design constraints, given the need for positioning the proximity sensor in a certain location).

Other solutions have been proposed for recognition of the aforementioned gesture of bringing the electronic device to the user's ear, for example with the combined use of multiple sensors, such as a movement sensor and a pressure sensor (in this regard, reference is made for example to document U.S. Pat. No. 10,942,578 B2).

The solution described in this document, although advantageous, since the use of a proximity sensor is avoided, may however have a complexity and an electrical consumption that is not compatible with at least some applications of the aforementioned mobile or wearable electronic devices.

BRIEF SUMMARY

Various embodiments of the present disclosure provide an alternative solution, which allows the drawbacks of the prior art, previously highlighted, to be overcome.

According to the present disclosure, a system and a method for recognition of the gesture of bringing a mobile or wearable electronic device to a user's ear are therefore provided. The system includes a movement sensor configured to provide a movement signal indicative of the movement of the electronic device; an electrostatic charge variation sensor configured to provide a charge variation signal associated with the movement; and a processing module operatively coupled to the movement sensor and to the electrostatic charge variation sensor, and configured to perform a joint processing of the movement signal and the charge variation signal for the recognition of the gesture.

BRIEF DESCRIPTION OF THE SEVERAL VIEWS OF THE DRAWINGS

For a better understanding of the present disclosure, various embodiments thereof are now described, purely by way of non-limiting example, with reference to the attached drawings, wherein.

DETAILED DESCRIPTION

Figure 1:
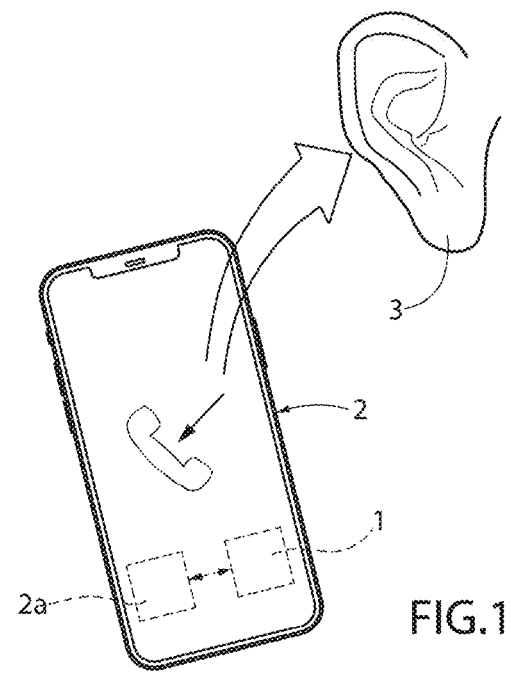
FIG. 1 schematically depicts the gesture of bringing an electronic device to a user's ear.

As will be clarified in detail below, the present solution represents an alternative to the use of a proximity sensor for the recognition of the gesture of bringing a mobile or wearable electronic device to a user's ear ("phone-to-ear" gesture), allowing, as a result, an implementation without the same proximity sensor.

To this end, one aspect of the present solution provides for the joint use, with a so-called "sensor fusion" algorithm, of a movement sensor, in particular of an accelerometer sensor having three detection axes (commonly used in mobile electronic devices for several functions, including pedometer, screen rotation, orientation, etc.); and of an electrostatic charge variation sensor, configured to provide a charge variation signal, as a function of the contact or close proximity of the electronic device with the body, in particular with the ear, of the user.

The charge of an electrostatically charged body may be easily transferred to another body, in conditions of direct contact between the elements or at a distance. When the charge is transferred between two electrically isolated objects, a static charge is generated whereby the object with an excess of electrons is negatively charged and the object with a deficit of electrons is positively charged. The shift of the charges is of a different nature, depending on whether the object is a conductive object or a dielectric. In a conductor, electrons are distributed throughout the material and are free to move, based on the influence of external electric fields. In a dielectric, there are no free-to-move electrons but electric dipoles, with random directions in space (therefore with zero resulting net charge), which may be oriented or deformed by an external electric field, thus generating an orderly distribution of charges and therefore a polarization. The charge may still be movable, depending on the properties of the material and other environmental factors.

In the present solution, the electrostatic charge variation sensor is configured to sense the electric field (and therefore the electrostatic potential) variations which occur over time due to the local electrostatic charge variation, caused by the proximity or contact between the electronic device, having the sensor coupled thereto, and the user's ear.

In particular, when the charge variation sensor is in close proximity to or comes into contact with the user's ear, an evident (and detectable) variation in the charge variation signal provided by the electrostatic charge variation sensor occurs, due to the coupling with the body of the same user.

It is underlined that the aforementioned electrostatic charge variation sensor is not equivalent to a proximity sensor of a capacitive type.

By way of example, in this regard the following bibliographic reference may be mentioned:

Yan, Yong, Hu, Yonghui, Wang, Lijuan, Qian, Xiangchen, Zhang, Wenbiao, Reda, Kamel, Wu, Jiali, Zheng, Ge (2021), "Electrostatic Sensors—Their Principles and Applications", Measurement, 169. Article Number 108506. ISSN 0263-2241 (https://kar.kent.ac.uk/83063/).

In this reference, the difference between the aforementioned sensors is specified, in that the field fluctuation in an electrostatic charge variation sensor originates from the movement of a charged object, while the electric field in a capacitive sensor stems from an active electrode that creates the electric field and the object to be measured modulates the electric field (usually variable in a sinusoidal manner) by varying the distance, the geometry of the electrode or the dielectric properties of the medium. In particular, the electrostatic charge variation sensor measures charge variation events, without the generated signal having a direct connection with a distance measurement (as opposed to what occurs with a proximity sensor of a capacitive type, whose sensed signal has an amplitude that depends directly on the distance from an object and does not carry instead any information associated with electrostatic field variation events).

With reference first to FIG. 1, a recognition system 1 is now described, which may be implemented inside a mobile or wearable electronic device (hereinafter simply referred to as the electronic device) 2 to recognize the gesture of bringing the same electronic device 2 to a user's ear 3, in particular for management of an incoming call (as schematically depicted).

The electronic device 2 is provided with an own control unit 2a, for example a microprocessor unit, which implements a suitable operating system and is coupled to the recognition system 1, in such a way as to activate suitable functions upon recognition of the phone-to-ear gesture, for example to manage the aforementioned call.

Figure 2:
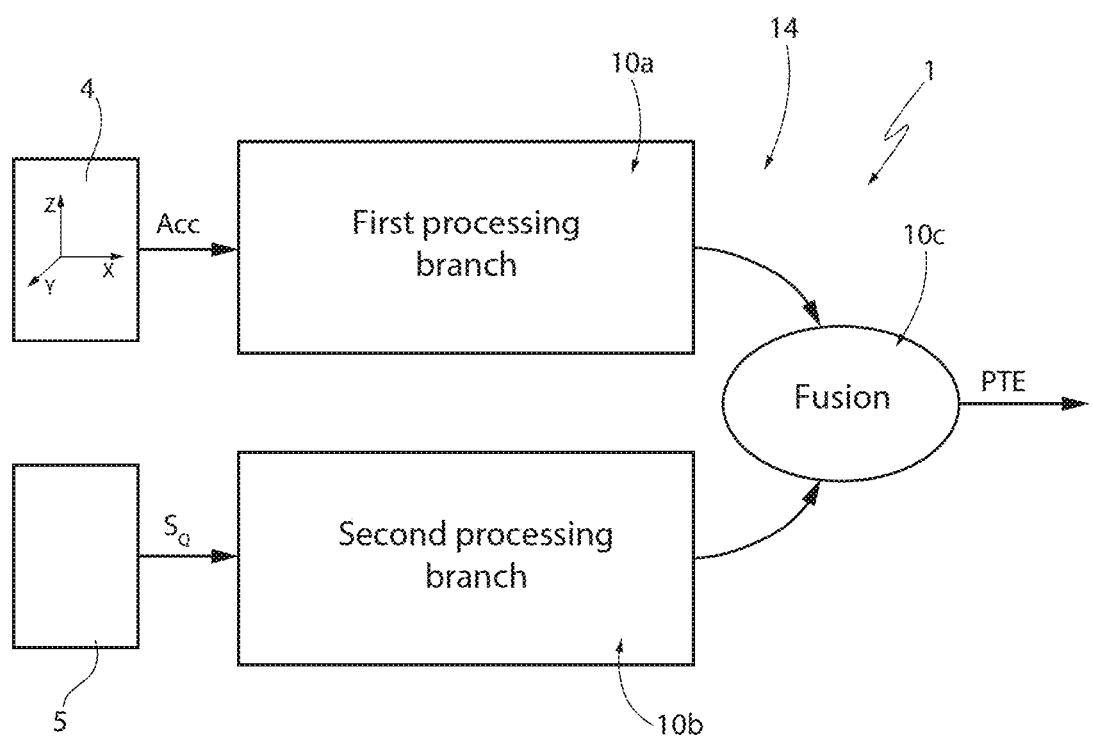
FIG. 2 shows a schematic block diagram of a system for recognition of the gesture of bringing the electronic device to the ear, according to an embodiment of the present solution.

As shown schematically in FIG. 2, the recognition system 1 comprises: a movement sensor 4, in particular an accelerometer having three detection axes x, y and z, which provides a movement signal, in particular an acceleration signal Acc (having respective acceleration components $Acc_x$, $Acc_y$ and $Acc_z$ along the three detection axes x, y and z forming a set of three Cartesian axes, orthogonal to each other) indicative of the movement, in particular of the acceleration acting on the electronic device 2; and an electrostatic charge variation sensor 5, which provides a charge variation signal $S_Q$ indicative of electrostatic charge variations that occur during the movement of the electronic device 2, in particular due to the contact (or close proximity) with the body, in particular with a user's ear 3.

Advantageously, the movement sensor 4 and the electrostatic charge variation sensor 5 may be made in an integrated manner with semiconductor technology, thus having a small occupation area and a low power consumption.

The recognition system 1 also comprises:

- a first processing branch 10a, operatively coupled to the movement sensor 4 and configured to process in a suitable manner (as described in detail below) the acceleration signal Acc, to output movement information, associated with recognition of the phone-to-ear gesture;
- a second processing branch 10b, operatively coupled to the electrostatic charge variation sensor 5 and configured to process in a suitable manner (as described in detail below) the charge variation signal $S_Q$, to output contact information of contact (or close proximity) with the user's ear 3, also associated with recognition of the phone-to-ear gesture; and
- a fusion block 10c, operatively coupled to the first and second processing branches 10a, 10b, and configured to implement a joint analysis algorithm (with the "sensor fusion" technique) based on the movement information provided by the aforementioned first processing branch 10a and on the contact information provided by the aforementioned second processing branch 10b, to output a recognition signal PTE, indicative of the recognition of the phone-to-ear gesture.

The first and second processing branches 10a, 10b and the fusion block 10c may be implemented by a processing module 14, which may be of digital type, for example including a microcontroller, processor, or an MLC (Machine Learning Core) processor residing in an ASIC (Application Specific Integrated Circuit) electronic circuit, distinct with respect to the control unit 2a (not shown here) wherein the operating system of the electronic device 2 is implemented; or be implemented, in whole or in part, within the same control unit 2a of the electronic device 2.

Furthermore, the aforementioned processing module 14 may be implemented, in whole or in part, in hardware, for example through one or more Finite State Machines (FSMs).

Figure 3:
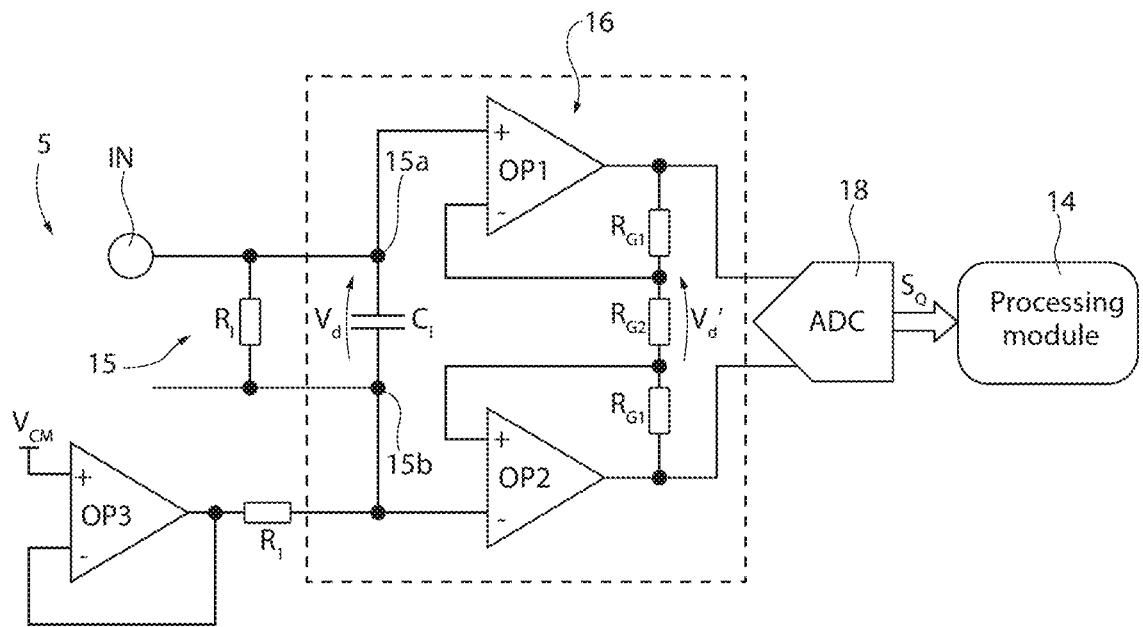
FIG. 3 shows a possible implementation of a charge variation sensor of the recognition system of FIG. 2.

FIG. 3 illustrates, by way of a non-limiting example, a possible embodiment of the electrostatic charge variation sensor 5, which comprises at least one input electrode IN, or detection electrode, made of a metal material, possibly covered with a dielectric material layer, designed to be arranged facing, or in proximity to, the external operating environment for sensing of the local charge variation (and the consequent field and electric potential variation). This input electrode IN may be provided at the front part of the aforementioned electronic device 2, possibly being, or be part of, a touch screen of the same electronic device 2.

This input electrode IN, in the exemplary illustrated solution, forms part of a differential input 15 of an instrumentation amplifier 16, being coupled to a corresponding first input terminal 15a.

An input capacitor $C_I$ and an input resistor $R_I$ are connected in parallel to each other between the first input terminal 15a and a second input terminal 15b of the differential input 15.

In use, an input voltage $V_d$ across the input capacitor $C_I$ varies due to the charge redistribution in the external environment. After a transient (with length given by the constant $R_I \cdot C_I$ defined by the parallel between the capacitor $C_I$ and the resistor $R_I$), the input voltage $V_d$ returns to its so-called steady-state value.

The instrumentation amplifier 16 is formed by two operational amplifiers OP1 and OP2, having non-inverting input terminals connected, respectively, to the first and second input terminals 15a, 15b and inverting terminals connected to each other by means of a gain resistor $R_{G2}$.

A biasing stage (buffer) OP3 biases the instrumentation amplifier 16 to a common mode voltage $V_{CM}$, through a resistor $R_1$ coupled to the second input terminal 15b.

The output terminals of the operational amplifiers OP1 and OP2 are connected to the respective inverting input terminals by means of a respective gain resistor $R_{G1}$; an output voltage $V_d'$ is present between the same output terminals.

As will be apparent from examination of the circuit, the gain $A_d$ of the instrumentation amplifier 16 is equal to $(1+2 \cdot R_1/R_2)$; therefore, the aforementioned output voltage $V_d'$ is equal to: $V_d \cdot (1+2 \cdot R_1/R_2)$.

The components of the instrumentation amplifier 16 are chosen so that the same instrumentation amplifier 16 has a low noise and a high impedance (for example around 109 Ohms) in its pass band (for example comprised between 0 and 500 Hz).

The aforementioned output voltage $V_d'$ is provided at input to an analog-to-digital converter (ADC) 18, which outputs the aforementioned charge variation signal $S_Q$ for the processing module 14. This charge variation signal $S_Q$ may be, for example, a high-resolution digital stream (of 16 or 24 bits).

According to a different embodiment, by having an analog to digital converter 18 with suitable characteristics (for example differential input, high input impedance, high resolution, dynamic range optimized for the quantities to be measured, low noise) the instrumentation amplifier 16 may be omitted, in this case the input voltage Vd being directly supplied to the input of the analog-to-digital converter 18, which again outputs the aforementioned charge variation signal $S_Q$.

In a manner not shown, the charge variation signal $S_Q$ may be provided to a first input of a multiplexer block, which may also receive, at a further input the aforementioned acceleration signal Acc (and possibly, at further inputs, further detection signals). The output of the multiplexer block is in this case coupled to an input of the processing module 14, providing the aforementioned charge variation signal and acceleration signal $S_Q$, Acc (and possibly further detection signals) for processing by the same processing module 14.

Figure 4:
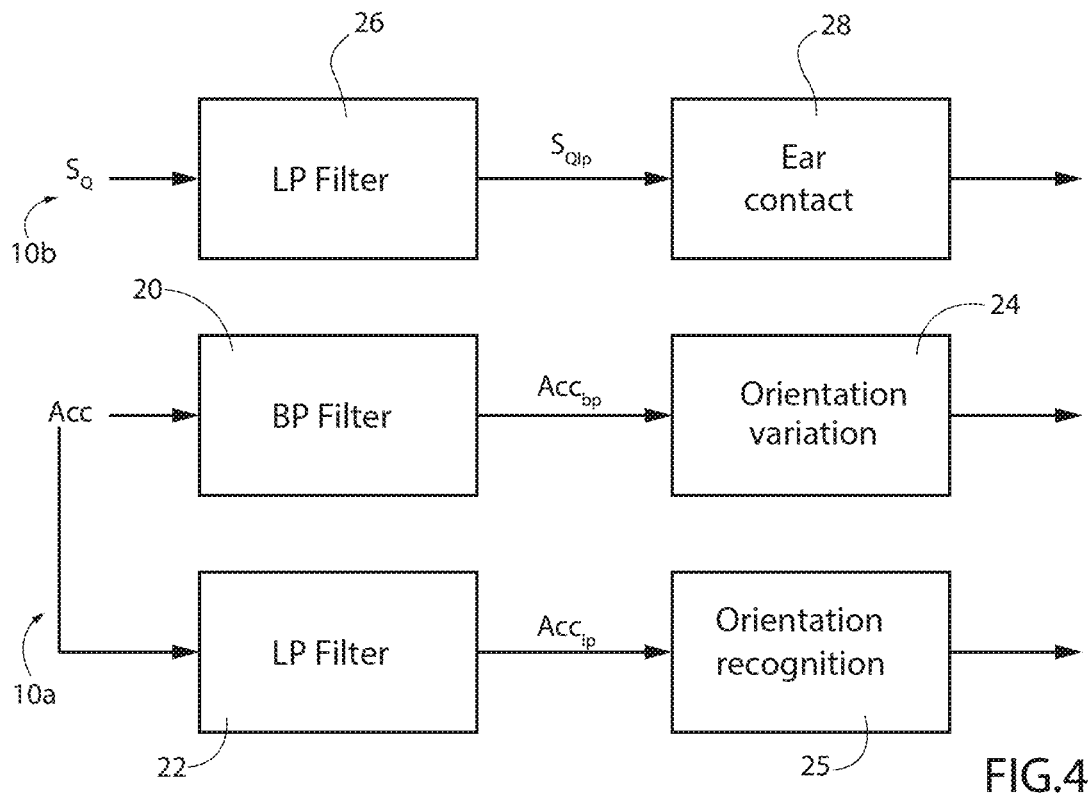
FIG. 4 shows a more detailed block diagram of a first and second processing branches of the recognition system of FIG. 2.

As shown in FIG. 4, in a possible embodiment, the aforementioned first processing branch 10a comprises:

a first filtering stage 20, configured to receive at its input the acceleration signal Acc and to perform a band-pass filtering thereof, providing at its output a band-pass filtered acceleration signal $Acc_{bp}$;

a second filtering stage 22, configured to receive at its input the same acceleration signal Acc and to perform a low-pass filtering thereof, providing at its output a low-pass filtered acceleration signal $Acc_{lp}$;

an orientation-variation detection stage 24, coupled to the first filtering stage 20 to receive the band-pass filtered acceleration signal $Acc_{bp}$ and configured to perform a processing of the same band-pass filtered acceleration signal $Acc_{bp}$ for detection of an orientation variation of the electronic device 2, indicative of the start of the phone-to-ear gesture (i.e., when the user raises the electronic device 2 towards the ear 3, typically starting from a substantially horizontal, or parallel to the ground, position of the same electronic device 2); and an orientation-detection stage 25, coupled to the second filtering stage 22 to receive the low-pass filtered acceleration signal $Acc_{lp}$ and configured to perform a processing of the same low-pass filtered acceleration signal $Acc_{lp}$ for the recognition of an orientation of the electronic device 2 compatible with a positioning of the electronic device 2, close to, or resting on, the user's ear 3, during execution of the call.

In turn, the aforementioned second processing branch 10b comprises:

a respective filtering stage (referred to as the third filtering stage) 26, configured to receive at its input the charge variation signal $S_Q$ and to perform a low-pass filtering thereof, providing at its output a low-pass filtered charge variation signal $S_{Qlp}$; and a contact detection stage 28, coupled to the aforementioned third filtering stage 26 to receive the low-pass filtered charge variation signal $S_{Qlp}$ and configured to perform a processing of the same low-pass filtered charge variation signal $S_{Qlp}$ for the detection of the contact (or close proximity) of the electronic device 2 with the user's ear 3, as a consequence of the execution of the call.

In greater detail, the first filtering stage 20 is configured to filter both the DC component of the acceleration signal Acc (due to gravity acceleration) and the high-frequency components of the same acceleration signal Acc (for example due to high-frequency vibrations or oscillations, or fast movements of the electronic device 2), so as to select the frequencies associated with the orientation variation due to the phone-to-ear gesture.

In a possible implementation, the band-pass filtering is performed with bandwidth [0.3-1.5 Hz], for example with an IIR filter of the first order.

The aforementioned second filtering stage 22 is configured to filter the high-frequency components of the same acceleration signal Acc and substantially select the DC component, associated with gravity acceleration and therefore with the spatial orientation of the electronic device 2.

In a possible implementation, the low-pass filtering is performed with a cut-off frequency of 1 Hz, in particular with an IIR filter of the first order.

The aforementioned third filtering stage 26 is configured to filter the high-frequency components of the charge variation signal $S_Q$, in particular to filter-out the effect of the electric supply line.

In a possible implementation, the low-pass filtering is performed with a cut-off frequency of 17 Hz, in particular with an IIR filter of the second order.

Figure 5:
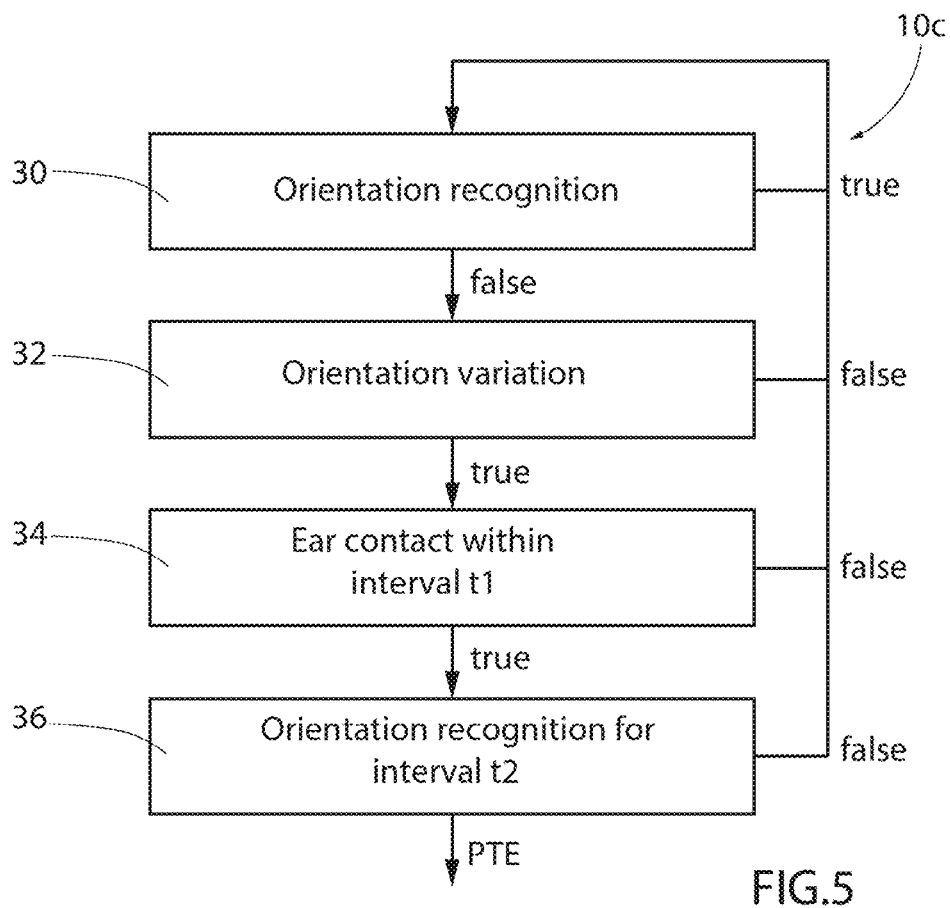
FIG. 5 is a flowchart of operations performed by a processing module of the recognition system of FIG. 2.

With reference to FIG. 5, a possible embodiment of the algorithm for recognition of the gesture of bringing the electronic device 2 to the user's ear 3 is now described; the algorithm is implemented by the processing module 14 (in particular by the corresponding fusion block 10c) of the recognition system 1 for generation of the aforementioned recognition signal PTE.

In a first step of the algorithm, so-called reset step, indicated by 30, the fusion block 10c verifies that the current orientation of the electronic device 2 is not compatible with the positioning in contact or in proximity with the ear during execution of the call.

In particular, assuming that the electronic device 2 is substantially stationary in proximity to the ear 3, the movement sensor 4 substantially senses the gravity acceleration g and the orientation of the same electronic device 2 determines how the same gravity acceleration g distributes along the three detection axes x, y and z (belonging to a reference system integral with the mobile electronic device 2). Therefore, evaluation of the amplitude of the acceleration components $Acc_{lpx}$, $Acc_{lpy}$ and $Acc_{lpz}$ of the low-pass filtered acceleration signal $Acc_{lp}$ allows to estimate the spatial orientation of the electronic device 2, and, based on this estimate, the consistency of this spatial orientation with the positioning in contact or in proximity with the user's ear 3 during the call may be evaluated.

Figure 6A:
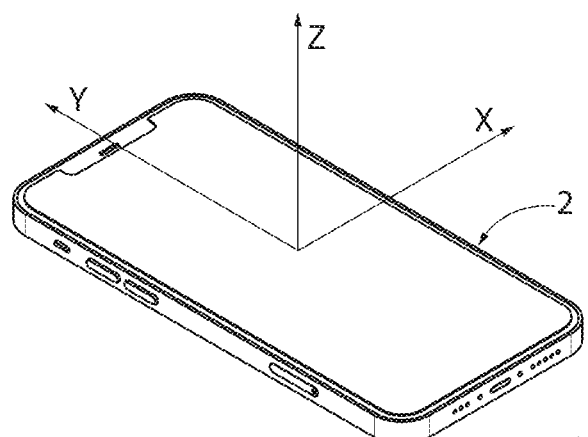
FIGS. 6A-6B relate to the arrangement of a reference system integral with the mobile electronic device, with respect to the recognition of the phone-to-ear gesture.

FIG. 6A shows, in this regard, a possible arrangement of the reference system xyz integral with the electronic device 2 (considered with the display screen facing upwards, i.e., towards the observer) and of the three detection axes x, y, z of the movement sensor 4, according to the so-called ENU (East North Up) convention. In particular, according to the ENU convention, detection axis x is directed towards east, detection axis y is directed towards north and detection axis z is directed upwards, when the electronic device 2 is aligned to the Earth's reference system.

The aforementioned detection axes x and y therefore define a horizontal plane xy of main extension of the electronic device 2 (and of a corresponding display screen), and the aforementioned detection axis z is orthogonal to this horizontal plane xy.

Figure 6B:
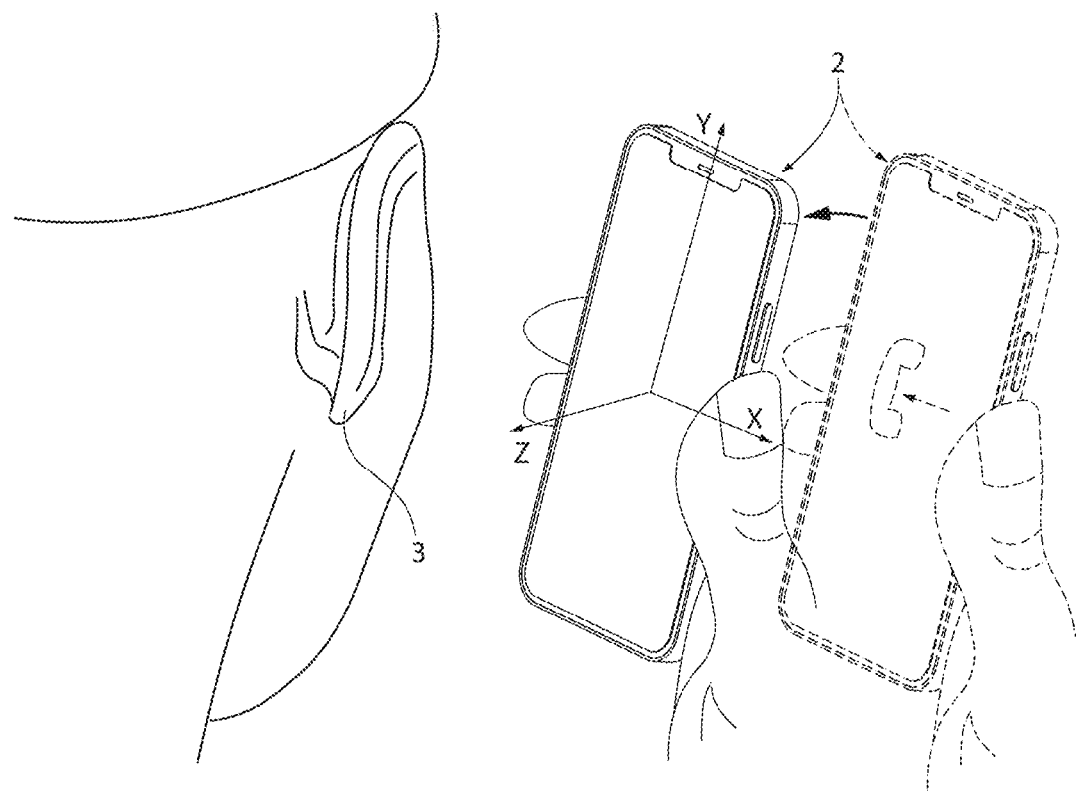

In the ENU convention, also referring to FIG. 6B, it may be verified that, when the electronic device 2 is arranged in the call position, brought into contact with the ear 3, the acceleration component along the detection axis y is typically positive with absolute value dependent on the tilting angle of the same detection axis y with respect to the direction of the force of gravity (being maximum with the detection axis y parallel to, and minimum with the same axis perpendicular to, the direction of the force of gravity, orthogonal to the ground); the acceleration component along the detection axis z has a small value, close to zero and however lower than a pre-set threshold; and the acceleration component along the detection axis x has a positive, or negative, value (depending on whether the same electronic device 2 is carried in the user's left or right hand) and dependent on the tilting angle of the detection axis x with respect to the direction of the force of gravity (being, in absolute value, maximum with the detection axis x parallel to, and minimum with the same axis perpendicular to, the direction of the force of gravity).

In a possible implementation, the aforementioned orientation-detection stage 25 therefore analyzes the value, with sign, of the acceleration component $Acc_{lpy}$ of the low-pass filtered acceleration signal $Acc_{lp}$ along the detection axis y and the absolute value of the acceleration component $Acc_{lpz}$ of the same low-pass filtered acceleration signal $Acc_{lp}$ along the detection axis z, and compares them with respective acceleration thresholds, to evaluate the orientation of the electronic device 2.

In particular, it is determined that the electronic device 2 is in a position compatible with the orientation during the call, in the event that the absolute value of the aforementioned acceleration component $Acc_{lpz}$ is lower than a first acceleration threshold, for example equal to 0.5 g (this value corresponding to a tilting angle of ±30° of the electronic device 2 between the detection axis z and a plane perpendicular to the direction of the force of gravity); and furthermore the value of the aforementioned acceleration component $Acc_{lpy}$ is higher than a second acceleration threshold having a negative value, for example equal to −0.5 g (this value corresponding to a tilting angle of −30° of the electronic device 2 between the detection axis y and a plane perpendicular to the direction of the force of gravity).

Similarly, it is determined that the electronic device 2 is not in a position compatible with the positioning during the call, in the event that the same acceleration components $Acc_{lpz}$ and $Acc_{lpy}$ do not meet the aforementioned conditions with respect to the respective acceleration thresholds.

In the event that, in step 30, it is verified that the electronic device 2 is not in a position compatible with the positioning during the call, the algorithm, step 32, envisages waiting the detection of an orientation variation of the electronic device 2, indicative of the start of the phone-to-ear movement.

In particular, this variation is detected, by the aforementioned orientation-variation detection stage 24, by comparing the component $Acc_{bpz}$ of the band-pass filtered acceleration signal $Acc_{bp}$ along the vertical axis z with a third acceleration threshold. In a possible embodiment, if this component $Acc_{bpz}$ is lower than the third acceleration threshold, having a negative value (for example equal to −0.2 g), the aforementioned orientation variation of the electronic device 2 is sensed.

After sensing the orientation variation, the algorithm envisages, step 34, detection of the contact (or close proximity) of the electronic device 2 with the user's ear 3 within a first time interval $t_1$ (for example equal to 0.4 s) starting from the aforementioned detection of the orientation variation.

To this end, the absolute value of the low-pass filtered charge variation signal $S_{Qlp}$ is compared, by the aforementioned contact detection stage 28, with a respective signal threshold and the contact (or close proximity) condition is determined in the event that this absolute value is higher than this signal threshold. For example, the value of the signal threshold may be set to 1024 LSB (Least Significant Bit), considering the case where the charge variation signal $S_Q$ is generated, as previously described, by the analog-to-digital converter 18.

After detecting the contact, the algorithm envisages, step 36, verifying that the orientation of the electronic device 4 is compatible with the orientation expected during the call (again by the aforementioned orientation-detection stage 25), for a time not shorter than a second time interval $t_2$, for example equal to 0.25 s (the duration of this second time interval should not be too short so as to avoid false detection, nor too long to ensure a reasonable latency time in recognizing the phone-to-ear gesture).

In detail, and as previously described, the orientation-detection stage 25 senses an orientation compatible with the positioning during a call in the event that the absolute value of the acceleration component $Acc_{lpz}$ of the low-pass filtered acceleration signal $Acc_{lp}$ is lower than the first acceleration threshold and furthermore the value of the acceleration component $Acc_{lpy}$ is higher than the second acceleration threshold.

In the event that these conditions are also met, the fusion block 10c of the processing module 14 generates at its output the recognition signal PTE, indicative of the recognition of the "phone-to-ear" gesture.

As shown in the aforementioned FIG. 5, in the event that the outcome of the aforementioned verifications is not positive (output "false") in each of steps 32, 34 and 36, the algorithm resets returning to step 30 previously described.

Figure 7:
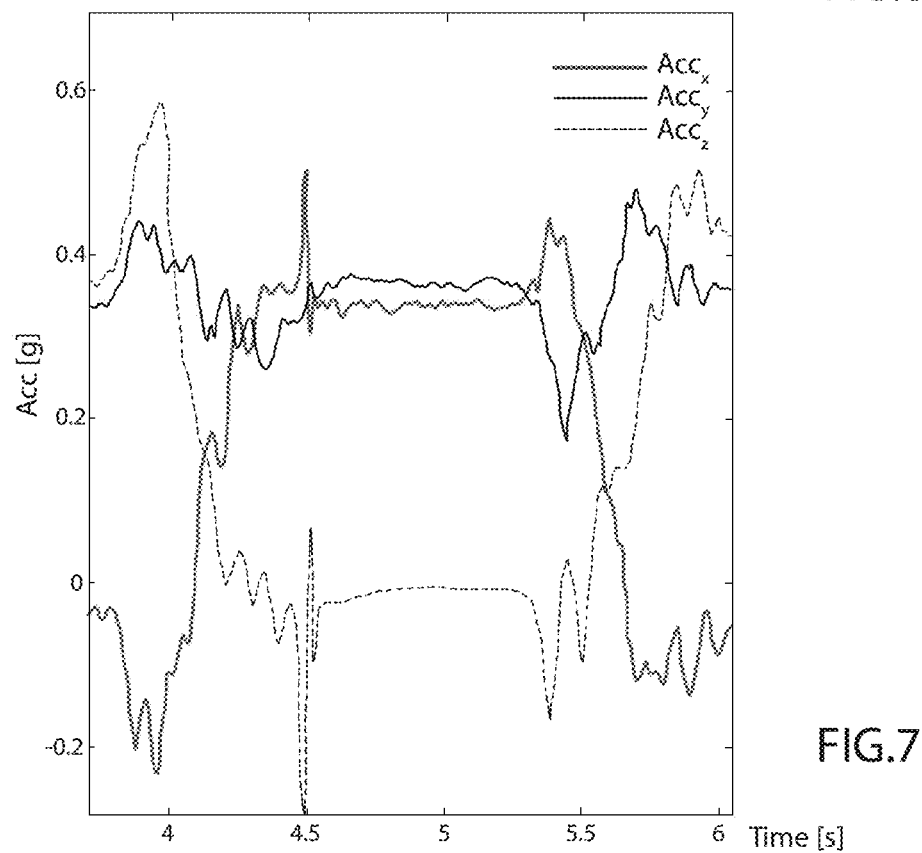
FIGS. 7 and 8 show plots of quantities associated with the recognition system of FIG. 2.

FIG. 7 shows the trend of the components $Acc_x$, $Acc_y$ and $Acc_z$ of the acceleration signal Acc provided by the movement sensor 4, during the gesture of bringing the electronic device 2 to the user's ear 3.

Figure 8:
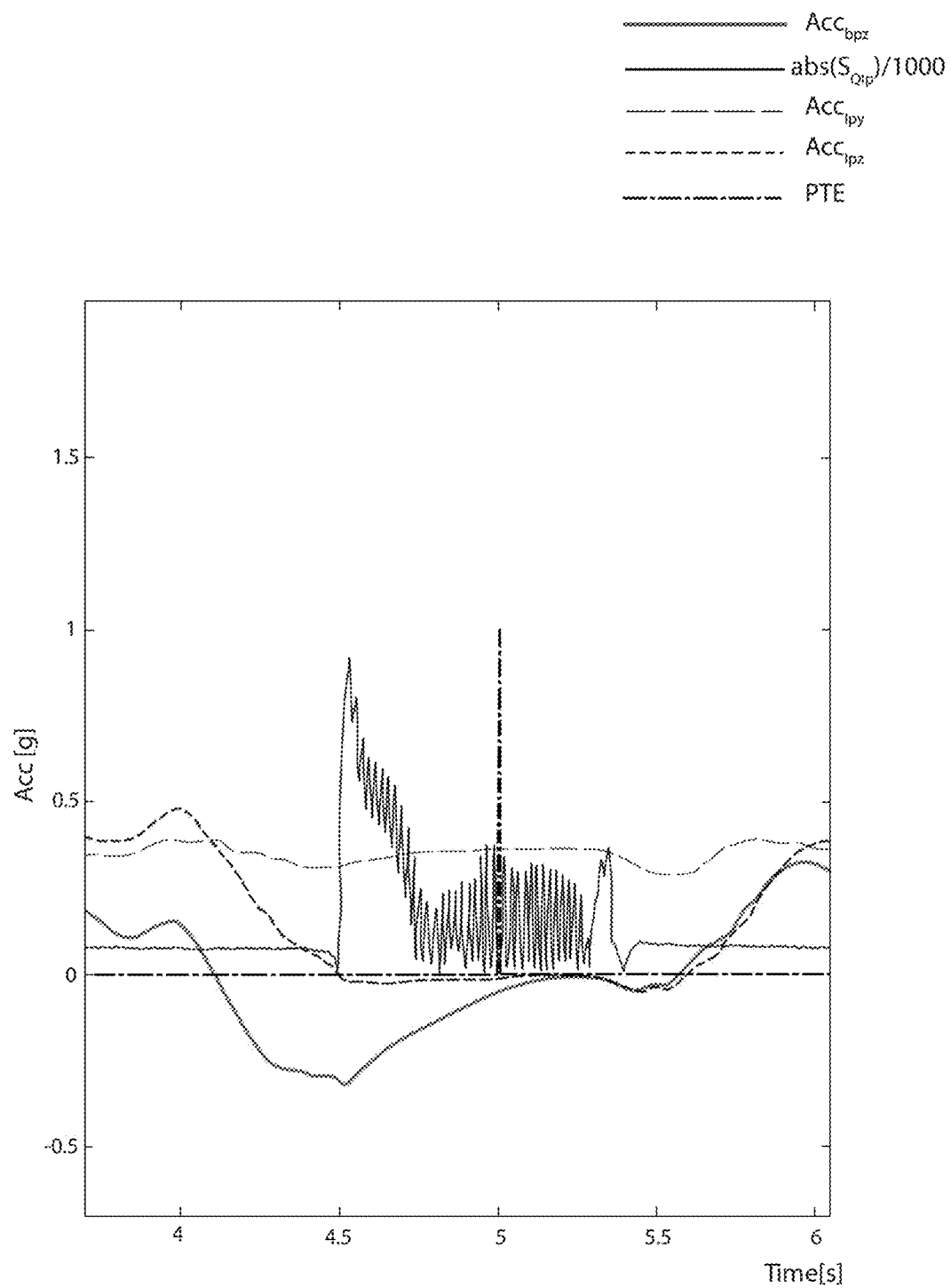

FIG. 8 shows the corresponding trend of the components $Acc_{lpy}$ and $Acc_{lpz}$ of the low-pass filtered acceleration signal $Acc_{lp}$, of the component $Acc_{bpz}$ of the band-pass filtered acceleration signal $Acc_{bp}$ and also of the absolute value of the low-pass filtered charge variation signal $S_{Qlp}$, suitably rescaled (in the example divided by 1000) for display reasons.

In particular, the aforementioned FIG. 8 also shows the recognition signal PTE indicative of the recognition of the gesture of bringing the electronic device 2 to the user's ear 3, having an impulse (with a positive value, '1') when the conditions provided for by the described algorithm are met.

The advantages of the present solution are clear from the previous description.

In any case, it is highlighted that this solution allows:
to implement a reliable recognition of the gesture of bringing the electronic device 2 to a user's ear 3;
to obtain a size reduction and a simplification in the routing of the traces in the layout of the electronic device 2, given the absence of a proximity sensor to be located at the top portion of the top face of the same electronic device 2;
a reduction in manufacturing costs, given the absence of a proximity sensor and the use of sensors (in particular, the movement sensor 4) already present and used for other functions in the electronic device 2; and
a reduction in power consumption, given that the combined consumption of the movement sensor 4 and the electrostatic charge variation sensor 5 is much lower (for example up to one hundredth) than the consumption associated with the proximity sensor.

The described solution is also very simple and may be implemented by means of a microcontroller (or similar digital processing module) having low computational resources (for example an 8-bit architecture), or directly on silicon (obtaining a further reduction in area occupation and power consumption), for example by using a programmable logic (implementing a finite state machine) for joint signal processing operations (which, as discussed, envisage simple operations of filtering and comparison with respective thresholds).

Finally, it is clear that modifications and variations may be made to what has been described and illustrated without thereby departing from the scope of the present disclosure.

In particular, it is emphasized that the algorithm effectively implemented by the recognition system 1 may vary, being adaptable according to the applications, requirements and processing capabilities available, as previously discussed.

Furthermore, the first processing branch 10a may envisage use of detection signals also from further movement sensors (in a manner not illustrated), to increase the accuracy of the information provided at the output, however at the expense of higher power consumption and area occupation. For example, in the aforementioned first processing branch 10a, a gyroscopic sensor and the associated information of rotation of the electronic device 2 might be used, to process the trend of the detected movement and/or evaluate the final position; in this case, the signal provided by the gyroscopic sensor would be suitably processed in association with the acceleration sensor Acc.

A recognition system (1) for recognition of a gesture of bringing an electronic device (2), of a mobile or wearable type, to a user's ear (3), designed to be integrated in said electronic device (2) may be summarized as including: a movement sensor (4), configured to provide a movement signal (Acc) indicative of movement of the electronic device (2); an electrostatic charge variation sensor (5), configured to provide a charge variation signal ($S_Q$) associated with said movement; a processing module (14), operatively coupled to said movement sensor (4) and to said electrostatic charge variation sensor (5) and configured to perform a joint processing of said movement signal (Acc) and charge variation signal ($S_Q$) for the recognition of said gesture.

The movement sensor (4) may be an accelerometer having three detection axes (x, y, z), configured to provide, as said movement signal (Acc), an acceleration signal having respective acceleration components ($Acc_x$, $Acc_y$, $Acc_z$) along three detection axes (x, y, z) of a reference system integral with said electronic device (2); and wherein said charge variation signal ($S_Q$) is indicative of electrostatic charge variations, due to contact or proximity with the user's ear (3).

The processing module (14) may include: a first processing branch (10a), operatively coupled to the movement sensor (4) and configured to process said movement signal (Acc), to output movement information associated with the recognition of said gesture; a second processing branch (10b), operatively coupled to the electrostatic charge variation sensor (5) and configured to process said charge variation signal ($S_Q$), to output contact information of contact or proximity with the user's ear (3); and a fusion block (10c), operatively coupled to the first and the second processing branches (10a, 10b) and configured to implement a joint analysis algorithm based on the movement information provided by said first processing branch (10a) and on the contact information provided by said second processing branch (10b), to output a recognition signal (PTE) indicative of the recognition of said gesture.

The first processing branch (10a) may include: an orientation-variation detection stage (24), configured to perform a first processing of the acceleration signal (Acc) for detection of a variation of orientation of the electronic device (2), indicative of a start of said gesture; and an orientation-detection stage (25), configured to perform a second processing of the acceleration signal (Acc) for recognition of an orientation of the electronic device (2) compatible with an expected orientation of the electronic device (2) in contact or in proximity with the ear during execution of a call.

The second processing branch (10b) may include a contact detection stage (28), configured to perform a processing of the charge variation signal ($S_Q$) for detection of the contact or proximity of the electronic device (2) with the user's ear (3).

The fusion block (10c) may be configured to determine the recognition of said gesture and generate said recognition signal (PTE) in the event that the following events are detected in a consecutive manner: the orientation variation of the electronic device (2) indicative of the start of the movement towards the user's ear; subsequently, within a first time interval ($t_1$), the contact or proximity with the ear (3); yet subsequently, the orientation of the electronic device (2) compatible with said expected orientation, for the duration of a second time interval ($t_2$).

The first processing branch (10a) may further include: a first filtering stage (20), configured to receive at its input the acceleration signal (Acc) and perform a band-pass filtering thereof, providing at its output a band-pass filtered acceleration signal ($Acc_{bp}$); and a second filtering stage (22), configured to receive at its input the acceleration signal (Acc) and perform a low-pass filtering thereof, providing at its output a low-pass filtered acceleration signal ($Acc_{lp}$); wherein said orientation-variation detection stage (24) is configured to detect said orientation variation of the electronic device (2), indicative of the start of said gesture, as a function of said band-pass filtered acceleration signal ($Acc_{bp}$); and said orientation-detection stage (25) is configured to recognize said orientation of the electronic device (2) compatible with an expected orientation of the electronic device (2) during execution of the call as a function of said low-pass filtered acceleration signal ($Acc_{lp}$).

The orientation-variation detection stage (24) may be configured to detect said orientation variation of the electronic device (2) based on the comparison of a component ($Acc_{bpz}$) of the band-pass filtered acceleration signal ($Acc_{bp}$) along a vertical axis (z), orthogonal to a horizontal plane of main extension of said electronic device (2), with a first acceleration threshold; and wherein said orientation-detection stage (25) is configured to recognize said orientation of the electronic device (2) compatible with an expected orientation of the electronic device (2) during the execution of the call, based on the comparison of a component ($Acc_{lpy}$) of said low-pass filtered acceleration signal ($Acc_{lp}$) along a horizontal axis (y) of said horizontal plane with a second acceleration threshold and of the comparison of the absolute value of a component ($Acc_{lpz}$) of said low-pass filtered acceleration signal ($Acc_{lp}$) along said vertical axis (z) with a third acceleration threshold.

The second processing branch (10b) may further include: a respective filtering stage (26), configured to receive at its input the charge variation signal ($S_Q$) and perform a low-pass filtering thereof, providing at its output a low-pass filtered charge variation signal ($S_{Qlp}$); wherein said contact detection stage (28) is configured to detect the contact or proximity of the electronic device (2) with the user's ear (3), based on the comparison of the absolute value of the low-pass filtered charge variation signal ($S_{Qlp}$) with a respective signal threshold.

The processing module (14) may not provide for the use of a proximity sensor for the recognition of said gesture.

An electronic device (2), of a mobile or wearable type, may be summarized as including the recognition system (1) according to any of the preceding embodiments, and a control unit (2a), coupled to the recognition system (1) and configured to activate corresponding functions upon recognition of the gesture.

The device may have cellular communication capability, wherein the control unit (2a) is configured to manage an incoming call, in response to the recognition of the gesture by said recognition system (1).

A method for recognition of a gesture of bringing an electronic device (2), of a mobile or wearable type, to a user's ear (3), may be summarized as including: generating a movement signal (Acc) indicative of the movement of the electronic device (2); generating a charge variation signal ($S_Q$) associated with said movement; performing a joint processing of said movement signal (Acc) and charge variation signal ($S_Q$) for the recognition of said gesture.

The method may include: processing said movement signal (Acc), to generate movement information associated with the recognition of said gesture; processing said charge variation signal ($S_Q$), to generate contact information of contact or proximity with the user's ear (3); and implementing a joint analysis algorithm based on the movement information and on the contact information, to provide a recognition signal (PTE) indicative of the recognition of said gesture.

The method may include determining the recognition of the gesture and generating the recognition signal in the event that the following events are sensed in a consecutive manner: an orientation variation of the electronic device indicative of a start of the movement towards the ear based on the processing of the movement signal; subsequently, within a first time interval, the contact or proximity with the ear, based on the processing of the charge variation signal; yet subsequently, an orientation of the electronic device compatible with an expected orientation of the electronic device in contact or in proximity with the ear during the execution of a call, for the duration of a second time interval, based on the processing of the movement signal.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A recognition system comprising:
a movement sensor configured to provide a movement signal indicative of movement of an electronic device;

an electrostatic charge variation sensor configured to provide a charge variation signal associated with the movement; and
a processor operatively coupled to the movement sensor and the electrostatic charge variation sensor, the processor configured to perform:
a first processing branch configured to output movement information associated with recognition of a gesture of bringing the electronic device to a user's ear based on the movement signal, the first processing branch including:
a first filtering stage configured to receive the movement signal, perform a band-pass filtering of the movement signal, and output a band-pass filtered movement signal;
an orientation-variation detection stage being configured to detect, as a function of the band-pass filtered movement signal, a variation of orientation of the electronic device indicative of a start of the gesture;
a second filtering stage configured to receive the movement signal, perform a low-pass filtering of the movement signal, and output a low-pass filtered movement signal; and
an orientation-detection stage being configured to recognize, as a function of the low-pass filtered movement signal, an orientation of the electronic device compatible with an expected orientation of the electronic device in contact or in proximity with the user's ear during execution of a call;
a second processing branch configured to output contact information of contact or proximity with the user's ear based on the charge variation signal; and
a fusion block configured to implement a joint analysis algorithm based on the movement information and on the contact information, and output a recognition signal indicative of the recognition of the gesture based on the joint analysis algorithm.

2. The recognition system according to claim 1,
wherein the movement sensor is an accelerometer configured to provide, as the movement signal, an acceleration signal having respective acceleration components along three detection axes of a reference system integral with the electronic device; and
wherein the charge variation signal is indicative of electrostatic charge variations, due to contact or proximity with the user's ear.

3. The recognition system according to claim 1, wherein the second processing branch includes a contact detection stage configured to perform a processing of the charge variation signal for detection of the contact or proximity of the electronic device with the user's ear.

4. The recognition system according to claim 3, wherein the fusion block is configured to determine the recognition of the gesture and generate the recognition signal in a case where the following events are detected in a consecutive manner:
the variation of the orientation of the electronic device indicative of the start of the gesture;
within a first time interval from the detection of the variation of the orientation of the electronic device indicative of the start of the gesture, the contact or proximity with the user's ear; and
the orientation of the electronic device compatible with the expected orientation of the electronic device, for a duration of a second time interval.

5. The recognition system according to claim 1, wherein the orientation-variation detection stage is configured to detect the variation of orientation of the electronic device based on a comparison of a component of the band-pass filtered movement signal along a vertical axis, orthogonal to a horizontal plane of main extension of the electronic device, with a first movement threshold; and
wherein the orientation-detection stage is configured to recognize the orientation of the electronic device compatible with the expected orientation of the electronic device based on a comparison of a component of the low-pass filtered movement signal along a horizontal axis of the horizontal plane with a second movement threshold and on a comparison of an absolute value of a component of the low-pass filtered movement signal along the vertical axis with a third movement threshold.

6. The recognition system according to claim 3, wherein the second processing branch includes:
a filtering stage configured to receive the charge variation signal, perform a low-pass filtering of the charge variation signal, and output a low-pass filtered charge variation signal,
the contact detection stage being configured to detect the contact or proximity of the electronic device with the user's ear based on a comparison of an absolute value of the low-pass filtered charge variation signal with a signal threshold.

7. The recognition system according to claim 1, wherein the processor does not provide for usage of a proximity sensor for the recognition of the gesture.

8. An electronic device comprising:
a recognition system including:
a movement sensor configured to provide a movement signal indicative of movement of the electronic device;
an electrostatic charge variation sensor configured to provide a charge variation signal associated with the movement; and
a processor operatively coupled to the movement sensor and the electrostatic charge variation sensor, the processor configured to:
detect an orientation variation of the electronic device indicative of a start of a movement towards a user's ear based on the movement signal;
detect, within a first time interval from the detection of the orientation variation, contact or proximity with the user's ear based on the charge variation signal;
detect, subsequent to detecting the contact or proximity with the user's ear, an orientation of the electronic device compatible with an expected orientation of the electronic device in contact or in proximity with the user's ear during execution of a call, for a duration of a second time interval, based on the movement signal; and
determine, in response to detecting the orientation of the electronic device, a recognition of a gesture of bringing the electronic device to the user's ear; and
a controller coupled to the recognition system, the controller configured to activate corresponding functions upon the recognition of the gesture.

9. The electronic device according to claim 8,
wherein the electronic device has cellular communication capability; and
wherein the controller is configured to manage an incoming call, in response to the recognition of the gesture by the recognition system.

10. The electronic device according to claim 8, wherein the electronic device is a mobile type or a wearable type electronic device.

11. The electronic device according to claim 8,
wherein the movement sensor is an accelerometer configured to provide, as the movement signal, an acceleration signal having respective acceleration components along three detection axes of a reference system integral with the electronic device; and
wherein the charge variation signal is indicative of electrostatic charge variations, due to contact or proximity with the user's ear.

12. The electronic device according to claim 11, wherein the processor is configured to perform:
a first processing branch configured to output movement information associated with the recognition of the gesture based on the movement signal;
a second processing branch configured to output contact information of contact or proximity with the user's ear based on the charge variation signal; and
a fusion block configured to implement a joint analysis algorithm based on the movement information and on the contact information, and output a recognition signal indicative of the recognition of the gesture based on the joint analysis algorithm.

13. The electronic device according to claim 12, wherein the first processing branch includes:
an orientation-variation detection stage configured to perform a first processing of the acceleration signal for detection of a variation of orientation of the electronic device, indicative of a start of the gesture; and
an orientation-detection stage configured to perform a second processing of the acceleration signal for recognition of an orientation of the electronic device compatible with an expected orientation of the electronic device in contact or in proximity with the user's ear during execution of a call.

14. The electronic device according to claim 13, wherein the second processing branch includes a contact detection stage configured to perform a processing of the charge variation signal for detection of the contact or proximity of the electronic device with the user's ear.

15. A method, comprising:
generating a movement signal indicative of a movement of an electronic device;
generating a charge variation signal associated with the movement; and
detecting an orientation variation of the electronic device indicative of a start of a movement towards a user's ear based on the movement signal;
detecting, within a first time interval from the detection of the orientation variation, contact or proximity with the user's ear based on the charge variation signal;
detecting, subsequent to detecting the contact or proximity with the user's ear, an orientation of the electronic device compatible with an expected orientation of the electronic device in contact or in proximity with the user's ear during execution of a call, for a duration of a second time interval, based on the movement signal; and
determining, in response to detecting the orientation of the electronic device, a recognition of a gesture of bringing the electronic device to the user's ear.

16. The method according to claim 15, further comprising:
outputting a recognition signal indicative of the recognition of the gesture.

* * * * *